United States Patent Office 3,660,573
Patented May 2, 1972

3,660,573
STABLE AMINOCHROME-LIKE COMPOUNDS RESULTING FROM MILD OXIDATION OF DOPA AND REACTION WITH KETONIC REAGENTS
Norman Barsel, 133—17 Francis Lewis Blvd.,
Laurelton, N.Y. 11413
No Drawing. Filed Feb. 26, 1968, Ser. No. 707,987
Int. Cl. A61k 27/00
U.S. Cl. 424—232                        3 Claims

ABSTRACT OF THE DISCLOSURE

Stable aminochrome-type structures of the general formula

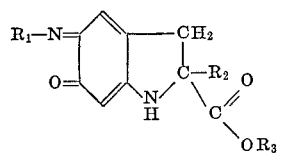

where $R_1$—N results from reaction of 5-keto group of aminochrome with nitrogen-containing reagent selected from the group consisting of hydroxylamine, hydrazine, parahydrazine benzoic acid, parahydrazine salicylic acid, methyl phenyl hydrazine, nitro-phenyl hydrazine, phenyl hydrazine, semicarbazide, thiosemicarbazide and isonicotinic acid hydrazine, $R_2$ is a member of the group consisting of hydrogen and methyl, and $R_3$ is a member of the group consisting of hydrogen, alkali metal and ammonium, prepared by oxidizing $\beta$-(3,4-dihydroxy phenyl alanine) under mild conditions with an agent selected from the group consisting of alkali metal ferricyanide in alkali bicarbonate buffer and alcoholic silver oxide under acidity and temperature conditions to minimize decomposition and produce a clear solution, separating any precipitates which form to maintain this clear solution whereby an aminochrome-type structure is formed, adjusting the pH to 2 to 4, and adding a nitrogen-containing reagent which reacts with the 5-keto group present in the aminochrome-type structure. The compounds of the formula are useful as acid-base indicators and certain of the compounds are useful as central nervous system stimulants and anti-hypertensive agents.

---

The present invention relates to stable aminochrome-type compounds resulting from mild oxidation of $\beta$-(3,4-dihydroxy phenyl alanine), hereinafter referred to as DOPA, and of the $\alpha$-substituted homologue of DOPA which is recovered in the form of a stabilized monoketone derivative of the formula

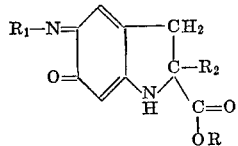

where $R_1$–N results from reaction of 5-keto group of aminochrome with nitrogen-containing reagent selected from the group consisting of hydroxylamine, hydrazine, parahydrazine benzoic acid, parahydrazine salicylic acid, methyl phenyl hydrazine, nitrophenyl hydrazine, phenyl hydrazine, semicarbazide, thiosemicarbazide and isonicotinic acid hydrazine, $R_2$ is H or $CH_3$ and $R_3$ is H or an alkali metal or ammonium.

The foregoing formula is structurally comparable to adrenochrome, the pigment obtained by the oxidation of epinephrine, and contains the ortho-quinone ring fused to the pyrrole ring; but it lacks the hydroxyl group in the pyrrole ring which is present in adrenochrome and contains acidic hydrogen attached to nitrogen of the pyrrole ring. As seen in the above formula, the hydroxyl of adrenochrome is replaced by hydrogen in the dopachrome structure and the pyrrole $\alpha$-carbon atom, lying between the nitrogen and the substituting hydrogen, is activated by substitution with a carboxyl group which can be in the form of the acid or salt. This carboxyl group tends to solubilize the dopachorme structure.

The term "dopachrome structure" herein is a simple designation which depicts the DOPA side chain cyclization in creating the pyrrole ring having a highly substituted $\alpha$-carbon atom and lacking acidity at the $\beta$-carbon atom. Due to the branched chain substitution at the $\alpha$-carbon atom of the pyrrole ring and to the strong solubilizing effect of the carboxyl group, there is even greater instability in free dopachrome solution than in adrenochrome or aludrinochrome solutions. Unless the conditions of preparation and recovery of the stable derivative are closely controlled to avoid decomposition, attempts at synthesis will fail.

To prepare dopachrome, mild oxidation of DOPA with either alkali metal ferricyanide or silver oxide in buffered aqueous or alcoholic medium can succeed only if reaction conditions are adjusted to permit in situ precipitation of the stable ketone derivative.

The dopachrome is highly soluble in water and in alcohol and rapidly decomposes when subjected to heat, strong acid or strong alkali. Therefore, oxidation is carried out close to neutrality to achieve a clear solution which is filtered to eliminate contamination and the pH of which is adjusted to a value of from about 2 to 4 by adding concentrated mineral acid in small increments while discarding any precipitates which form during the addition and thereafter refrigerating the solution to crystallize the stable dopachrome derivative therefrom.

All of the foregoing dopachrome monoketone derivatives, including those resulting from the reaction of the $\alpha$-substituted homologues of dopachrome, are especially useful as acid-base indicators, and certain of the compounds are useful as central nervous system stimulants and anti-hypertensive agents, particularly the hydrazino benzoic acid derivative of dopachrome and the semicarbazone of dopachrome.

In general, the stable sulfur-free dopachrome monoketone derivatives are of special interest as pharmacologically acceptable products which can be tolerated by animals. By analogy with adrenochrome, which is a pharmacologically acceptable pigment useful for treating capillary bleeding and is obtained by the mild oxidation of epinephrine (a product occurring naturally in the animal body), and with aludrinochrome, which I have disclosed in my U.S. Pat. No. 3,287,216 as a hypotensive and a diuretic agent, one would expect that dopachrome or its methyl homologue would reduce the blood pressure of normal animals and would also reduce capillary bleeding.

It was surprising to find that the sulfur-free stable dopachrome compounds of the present invention, resulting from the reaction of the 5-keto group with sulfur-free, nitrogen-containing keton reagent, act in mice as central nervous system stimulants while having no reducing effect upon the blood pressure of the normal animal. However, in hypertensive mice, a marked reduction in blood pressure is observed which persists for a longer period of time than that which can be achieved by the administration of aludrinochrome, and the central nervous system stimulation is also observed. This is completely unexpected. The combination of anti-hypertensive activity with central nervous system stimulation has never been observed in the aminochrome series.

These benefits permit the use of the therapeutically acceptable stable compound as a central nervous system energizer for normal animals without complication of reduction in blood pressure. Central nervous system energization in animals having elevated blood pressure is especially difficult if further increase in blood pressure is to be avoided and the stable derivatives of the present invention uniquely fulfill the need for normalizing the blood pressure while stimulating the central nervous system.

Tables I, II and III below summarize the results of comparative tests for capillary bleeding, central nervous system stimulation and reduction of blood pressure.

For the test results shown in Table I, groups of 24 animals were given the compounds listed in an amount of 3 mg./kg. by intraperitoneal administration. The control group received no compound. One-half hour later, the tails of the mice were severed and the blood loss from the severed tails was measured. The average blood loss of mice in the group is expressed in milliliters.

TABLE I

| Compound administered: | Blood loss |
|---|---|
| Control | 0.127 |
| Adrenochrome semicarbazone | 0.101 |
| Hydrazino benzoic acid derivative of dopachrome | 0.126 |
| Semicarbazone of dopachrome | 0.125 |

The above data show that the stable dopachrome derivative has no significant effect on capillary bleeding.

For the test results shown in Table II on central nervous system stimulation, groups of 30 mice were narcotized with ethyl alcohol and the compounds indicated were administered, except that the control group received no compound. The average sleeping time is shown in minutes.

TABLE II

| Compound administered to groups of narcotized animals: | Sleeping time (in minutes) |
|---|---|
| Control—none | 31.4 |
| Amino oxyacetic acid derivative of adrenochrome | 28.0 |
| Isonicotinic acid hydrazone of aludrinochrome | 29.0 |
| Semicarbazone of dopachrome | 21.0 |
| Parahydrazino benzoic acid derivative of dopachrome | 20.0 |

Table III shows the blood pressure effects in hypertensive rats. The blood pressure was determined in hypertensive rats anaesthetized with pento barbital employed the cannulated carotid artery technique for introducing parahydrazino benzoic acid derivative of dopachrome at a level of 16 mg./kg. to one group of animals and adrenochrome semicarbazone at the same level to another group. The time shown is in minutes and represents the interval after administration when the blood pressure reading was taken.

TABLE III

| Parahydrazino benzoic acid derivative of dopachrome | | Adrenochrome semicarbazone | |
|---|---|---|---|
| Time | Blood pressure | Time | Blood pressure |
| 0 | 170 | 0 | 165 |
| 4 | 125 | 5 | 165 |
| 10 | 70 | 10 | 160 |
| 15 | 75 | 15 | 165 |
| 20 | 85 | 30 | 165 |
| 40 | 65 | | |
| 60 | 60 | | |

In a normotensive 140/100 rate rat, 30 mg./kg. of parahydrazino benzoic acid derivative of dopachrome in three divided doses had no effect.

Preferred therapeutically-acceptable, pharmacologically-active stable derivatives of the present invention include the oxime, the semicarbazone, the parahydrazone of benzoic acid and the parahydrazone of salicylic acid.

All of the derivatives of the present invention act as acid-base indicators as evidenced by the following:

(1) The phenyl hydrazone with alkali yields a yellow color and, with acid, changes to light red.
(2) The semicarbazone with alkali is orange red and, with acid, is lemon yellow.
(3) The hydrazino benzoic acid derivative with alkali is dark red and, with acid, is orange.
(4) The salicylic acid hydrazone with alkali is orange red and, with acid, is yellow.

The thiosemicarbazone, the nitrophenyl hydrazone, the chlorophenyl hydrazone and similar derivatives also make good acid-base indicators with characteristic orange-yellow coloration. A typical purification of the indicator is carried out for the phenyl hydrazone of dopachrome by dissolving in hot methanol and adding 1 or 2 volumes of cold water. This yields a red crystal with a decomposition point of 165–166° C. The semicarbazone is recrystallized by dissolving in hot methanol and concentrating to less than half the volume. It comes out as a mustard color crystal.

The following specific examples serve to illustrate but are not intended to limit the present invention.

EXAMPLE I

A suspension of 5 grams of β-(3,4-dihydroxy phenyl alanine) in 700 cubic centimeters of distilled water was prepared and to this suspension was added a solution of 25 grams of potassium ferricyanide and 8 grams of sodium bicarbonate in 100 cubic centimeters of water while stirring over a fifteen minute period. The resulting mixture was then permitted to react with a 100 cubic centimeter solution of 8.3 grams sodium acetate and 5.0 grams of semicarbazone hydrochloride. It was then clarified with the aid of a filter aid. The pH of this solution was about 4.4. By adding concentrated hydrochloric acid a few cubic centimeters at a time, the acidity of the solution was brought down gradually to a pH of 2.70 in three or four steps, and each time the solution became cloudy, it was permitted to stand for about 5 minutes and then was rapidly filtered with the aid of a filter acid. The small amounts of precipitates which were formed during each of the steps were removed by filtering and were discarded.

The resulting clear red solution was refrigerated for one hour at 5° C. to crystallize a red precipitate which was filtered, washed first with water and then with ethanol and vacuum dried. The melting point of the same carbazone with decomposition was above 150° C.

EXAMPLE II

A solution of DOPA was prepared as in Example I above, except that:

Instead of using a solution of 25 grams of potassium ferricyanide in water, a suspension of 25 grams of silver oxide in methanol was employed, the amount of methanol being that shown in Example I of my U.S. Pat. 3,287,216. The preparation continued as in Example I hereinabove and after adjusting the pH to 2.5, clarifying by filtration and refrigerating, the semicarbazone had the same melting point as that obtained in Example I.

EXAMPLE III

The procedure of Example II was followed to prepare the oxime from hydroxylamine hydrochloride. The oxime was red in color and had an undeterminable decomposition point (well above 150° C.), and gradually turned black upon continued heating.

EXAMPLE IV

The procedure of Example III was followed to prepare the phenylhydrazone from phenylhydrazine hydrochloride. The phenyl hydrazine was red in color, gradually decomposed above 150° C. changing to black.

EXAMPLE V

The benzoic acid parahydrazone was prepared in the same manner as in Example III from benzoic acid parahydrazine hydrochloride. It was very dark red in color and had decomposition properties similar to those of the phenyl hydrazone.

EXAMPLE VI

The salicylic acid hydrazine was prepared in the same manner as in Example III from salicylic acid hydrazine hydrochloride. The color and decomposition properties were as in Example V above.

EXAMPLE VII

Each of the dry products of Examples IV, V and VI was formed into tablets by adding thereto the usual excipients and fillers, such as milk sugar, starch, etc., so that each tablet for oral administration contained approximately 10 mg. of the dopachrome derivative. These tablets were useful to reduce the blood pressure of hypertensive mice and also were useful to stimulate the central nervous system of normal mice as well as of hypertensive mice. Dosages of from 1 to 5 tablets daily were well tolerated by the mice (10 to 50 mg.).

The dopachromes of the present invention are zwitterions because of the amphoteric properties that they show as amino acids. The relationship may be expressed by the classical equation:

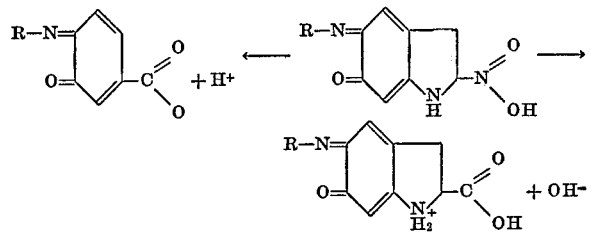

This amphoteric property is of benefit since these dopachromes can be put into solution by adding either acid or base. Base addition is often preferred from a pharmaceutical point of view since the addition of the base raises the pH above 2.2 towards the neutral point of 7.0 and permits a more physiologically tolerated injection to be administered, e.g. one which matches the pH of plasma. This eliminates the use of solubilizers like the salicylates or the naphthionates of the types shown in Barsel U.S. Pats. Nos. 3,287,216 and 2,791,532 as are used in intramuscular injections of solutions whose pH is extremely acid (below 4.0). These are very painful and, therefore, the intramuscular injection that can be made at a pH between 6.0 and 8.0 is very desirable.

The dopachromes of the present invention are much less toxic than the salicylate and naphthionate complexes of adrenochrome described in Barsel U.S. Pat. No. 2,791 532 and the aludrinochrome complexes described in Barsel U.S. Pat. No. 3,287,216. The $LD_{50}$ of adrenochrome salicylate and naphthionate complexes is of the order of 30 mg./kilo. The $LD_{50}$ of the aludrinochrome salicylate and naphthionate complexes is also of the order of 30 mg./kilo. In contrast, the dopachrome has an $LD_{50}$ of at least about 200 mg./kilo.

Thus, the dopachrome without solubilizing complexes is far less toxic and capable of being administered without the pain and discomfort associated with the prior art products. A solution containing about 10 mg./cc. of the dopachrome derivative represents an effective dose and the products of the invention may be used in the form of aqueous solutions for subcutaneous and intramuscular injection. For oral administration, dry products are prepared by adding excipients and fillers, e.g., milk sugar, starch, etc., so that each dosage will contain 10 mg. of the dopachrome derivative. Daily dosage of from 10 to 50 mg. are easily tolerated by mice and are effective to reduce the blood pressure of hypertensive mice and to stimulate the central nervous system.

When the water-soluble dopachrome derivatives are treated with alkali, such as sodium hydroxide, potassium hydroxide and ammonium hydroxide, non-toxic water-soluble salts result which are stable and easy to handle for the preparation of aqueous solutions and tablets for oral administration.

What is claimed is:

1. A central nervous system stimulating composition comprising an aqueous solution containing at least 5 mg./cc. of dopachrome of the formula:

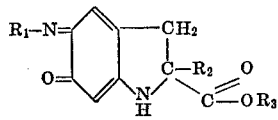

wherein $R_1$—N results from reaction, under mild oxidizing conditions in aqueous medium, first at close to neutrality to achieve a clear solution which is filtered and from which precipitates are discarded and then adjusted to pH 2–4, with dopa reactant having the 5-keto group of aminochrome and with nitrogen-containing reagent selected from the group consisting of hydroxylamine hydrazine, parahydrazine benzoic acid, parahydrazine salicylic acid, methyl phenyl hydrazine, nitrophenyl hydrazine, phenyl hydrazine, semicarbazide, thiosemicarbazide and isonicotinic acid hydrazine, $R_2$ is a member of the group consisting of hydrogen and methyl, and $R_3$ is a member of the group consisting of hydrogen, alkali metal and ammonium.

2. A parenterally administrable composition as claimed in claim 1 in unit dosage form comprising an aqueous solution containing about 10 mg. of said dopachrome compound per cc. of solution.

3. A central nervous system stimulating composition as claimed in claim 1 suitable for oral administration in unit dosage form, wherein said dopachrome is present in an amount of about 10 mg. for each unit dosage and said aqueous solution has added solid excipients and fillers.

References Cited
UNITED STATES PATENTS 2,791,532  5/1957  Fleischhacker et al. __ 424—266
3,287,216  11/1966  Barsel _____ 424—232

ALBERT T. MEYERS, Primary Examiner

D. M. STEPHENS, Assistant Examiner

U.S. Cl. X.R.
424—264, 274